(12) United States Patent
Iversen

(10) Patent No.: US 10,072,225 B2
(45) Date of Patent: Sep. 11, 2018

(54) CONVERSION OF ORGANIC MATTER INTO OIL

(71) Applicant: Altaca Insaat Ve Dis Ticaret A.S., Istanbul (TR)

(72) Inventor: Steen Brummerstedt Iversen, Vedbæk (DK)

(73) Assignee: Altaca Insaat Ve Dis Ticaret A.S., Istanbul (TR)

( * ) Notice: Subject to any disclaimer, the term of this patent is extended or adjusted under 35 U.S.C. 154(b) by 0 days.

(21) Appl. No.: 14/944,112

(22) Filed: Nov. 17, 2015

(65) Prior Publication Data
US 2016/0208183 A1 Jul. 21, 2016

Related U.S. Application Data

(62) Division of application No. 13/514,888, filed as application No. PCT/DK2010/000173 on Dec. 12, 2010, now Pat. No. 9,212,317.

(30) Foreign Application Priority Data

Dec. 11, 2009 (DK) .................................. 2009 01317

(51) Int. Cl.
*C10L 1/00* (2006.01)
*C10L 1/04* (2006.01)
*C10G 1/08* (2006.01)

(52) U.S. Cl.
CPC .............. *C10L 1/04* (2013.01); *C10G 1/086* (2013.01); *C10G 2300/1011* (2013.01);
(Continued)

(58) Field of Classification Search
CPC .............. C10L 1/04; C10L 2200/0469; C10L 2290/06; C10L 2290/08; C10L 2290/10;
(Continued)

(56) References Cited

U.S. PATENT DOCUMENTS 1,876,009 A * 9/1932 Krauch .................. C10G 1/086
                                                        208/112
2,154,527 A * 4/1939 Pier .......................... B01J 21/04
                                                        208/109
(Continued)

FOREIGN PATENT DOCUMENTS

EP         1 842 895      10/2007
WO      WO 89/08138       9/1989
(Continued)

OTHER PUBLICATIONS

Aguado et al., "Pyrolysis of Sawdust in a Conical Spouted Bed Reactor. Yields and Product Composition", *Ind. Eng. Chem. Res.* 39 (2000), 1925-1933.
(Continued)

*Primary Examiner* — Cephia D Toomer
(74) *Attorney, Agent, or Firm* — Knobbe, Martens, Olson & Bear, LLP

(57) ABSTRACT

The present invention relates to a process and apparatus for conversion of organic material into hydrocarbon based fuel such as an oil and relates in particular to a process and apparatus for recovering alkali salts and/or water soluble organics from water effluents from hydrothermal conversion processes of organics such as biomass and/or organic waste and/or other organic materials such as bitumen or lignite coal into oil in hot pressurized water. Another aspect of the invention relates to an integrated process for effective production of oil by conversion of slurries of biomass and/or organic waste and/or other organic materials such as bitumen or coal in hot pressurized water, wherein alkali salts and/or water soluble organics are recovered from the water effluent and is at least partly recycled to the feeding step thereby resulting in both a cleaned water effluent from the process as well as a more effective and economic process.

17 Claims, 8 Drawing Sheets

(52) U.S. Cl.
CPC ............. C10G 2300/4006 (2013.01); C10G 2300/4012 (2013.01); C10G 2300/4081 (2013.01); C10G 2300/805 (2013.01); C10L 2200/0469 (2013.01); C10L 2290/06 (2013.01); C10L 2290/08 (2013.01); C10L 2290/10 (2013.01); C10L 2290/46 (2013.01); C10L 2290/543 (2013.01); Y02P 30/20 (2015.11)

(58) Field of Classification Search
CPC ........... C10L 2290/46; C10L 2290/543; C10G 1/086; C10G 2300/1011; C10G 2300/4006; C10G 2300/4012; C10G 2300/4081; C10G 2300/805; Y02P 30/20
See application file for complete search history.

(56) References Cited

U.S. PATENT DOCUMENTS

| | | | |
|---|---|---|---|
| 3,261,392 | A | 7/1966 | Jacoby |
| 3,475,281 | A | 10/1969 | Rosenblad |
| 4,485,003 | A | 11/1984 | Coenen et al. |
| 6,375,803 | B1 | 4/2002 | Razzaghi et al. |
| 7,678,163 | B2 * | 3/2010 | Iversen .................... C10G 1/08 208/418 |
| 2006/0260186 | A1 * | 11/2006 | Iversen .................... C10G 1/08 44/605 |
| 2008/0050792 | A1 | 2/2008 | Zmierczak et al. |

FOREIGN PATENT DOCUMENTS

| | | |
|---|---|---|
| WO | WO 96/019412 | 6/1996 |
| WO | WO 2006/117002 | 11/2006 |

OTHER PUBLICATIONS

Börjesson et al., "Regional Production and Utilization of Biomass in Sweden", *Energy* (1996), vol. 21, No. 9, pp. 747-764.
Bridgwater et al., "An overview of fast pyrolysis of biomass", *Organic Geochemistry* 30 (1999), 1479-1493.
Bridgwater, "Principles and practice of biomass fast pyrolysis processes for liquids", *Journal of Analytical and Applied Pyrolysis* 51 (1999), 3-22.
Demirbas, "Effect of Temperature on Pyrolysis Products from Biomass", Energy Sources, Part A: Recovery, Utilization, and Environmental Effects, 29:4 (2007), 329-336.
Dominguez et al., "Gas chromatographic-mass spectrometric study of the oil fractions produced by microwave-assisted pyrolysis of different sewage sludges", *Journal of Chromatography A* 1012 (2003), 193-206.
Elliot et al., "Developments in Direct Thermochemical Liquefaction of Biomass: 1983-1990", *Energy & Fuels* 5 (1991), 399-410.
Feng et al., "Phase equilibria for biomass conversion processes in subcritical and supercritical water", *Chemical Engineering Journal* 98 (2004), 105-113.
Goudriaan et al., "Thermal efficiency of the HTU® Process for Biomass Liquefaction", in proceedings of the conference *Progress in Thermochemical Biomass Conversion* (edited by Bridgewater, A.V.), Blackwell Science: England, 2000; pp. 1312-1325.
Karagöz, et al., "Low-temperature catalytic hydrothermal treatment of wood biomass: analysis of liquid products", *Chemical Engineering Journal* 108 (2005), 127-137.
Karagöz, et al., "Hydrothermal upgrading of biomass: Effect of $K_2CO_3$ concentration and biomass/water ratio on products distribution", *Bioresource Technology* 97 (2006), 90-98.
Karl et al., "Modern Global Climate Change", *Science* 302 (2003), 1719-1723.
Kim et al., "Composition of corn dry-grind ethanol by-products: DDGS, wet cake, and thin stillage", *Bioresource Technology* 99 (2008), 5165-5176.
Labrecque, et al., "Combine Membranes with Mechanical Vapor Recompression", *Chemical Engineering* 111 (2004), 51-54.
Laohalidanond et al., "The Production of Synthetic Diesel from Biomass", *Sci. Tech. J.* (2006), vol. 6, No. 1, pp. 35-45.
Mann et al., "Global-scale temperature patterns and climate forcing over the past six centuries", *Nature* 392 (1998), 779-787.
Maschio et al., "Pyrolysis, a Promising Route for Biomass Utilization", *Bioresource Technology* 42 (1992), 219-231.
McKendry, "Energy production from biomass (part 1): overview of biomass", *Bioresource Technology* 83 (2002), 37-46.
McKendry, "Energy production from biomass (part 2): conversion technologies", *Bioresource Technology* 83 (2002), 47-54.
Sealock et al., "Chemical Processing in High-Pressure Aqueous Environments. 1. Historical Perspective and Continuing Developments", *Ind. Eng. Chem. Res.* 32 (1993), 1535-1541.
Srokol et al., "Hydrothermal upgrading of biomass to biofuel; studies on some monosaccharide model compounds", *Carbohydrate Research* 339 (2004), 1717-1726.
Yaman, "Pyrolysis of biomass to produce fuels and chemical feedstocks", *Energy Conversion and Management* 45 (2004), 651-671.
Zhang et al., "Comparison of non-catalytic and catalytic fast-pyrolysis of corncob in a fluidized bed reactor", *Bioresource Technology* 100 (2009), 1428-1434.
Zhong et al., "Thermodynamic modeling of biomass conversion processes", *Fluid Phase Equilibria* 194-197 (2002), 805-815.
*International Energy Outlook 2008*; Energy Information Administration, U.S. Department of Energy; Sep. 2008.
*TVR & MVR Systems*; Thermal & Mechanical Vapor Recompression Systems for Food & Dairy Industry; GEA Process Engineering Inc.; http://www.niroinc.com/evaporators_crystallizers/tvr_mvr_systems.asp.

* cited by examiner

GC-MS spectrum of bio-oil with peak identification.

A=decanoic acid;  B=dodecanoic acid;
C=tetradecanoic acid;  D=tridecanoic acid;
E=n-pentadecanoic acid;  F=palmitelaidic acid;
G=hexadecanoic acid;  H=11-cis-octadecenoic acid;
I=octadecanoic acid.

CONVERSION OF ORGANIC MATTER INTO OIL

CROSS REFERENCE TO RELATED APPLICATIONS

This application is a divisional and claims the benefit and priority to U.S. patent application Ser. No. 13/514,888, filed on Nov. 12, 2012, which is a U.S. National Phase Application of PCT International Application Number PCT/DK2010/000173, filed on Dec. 12, 2010, designating the United States of America and published in the English language, which is an International Application of and claims the benefit of priority to Danish Patent Application No. PA 2009 01317, filed on Dec. 11, 2009. The disclosures of the above-referenced applications are hereby expressly incorporated by reference in their entireties.

FIELD OF THE INVENTION

The present invention relates to a process and apparatus for conversion of organic material into hydrocarbon based fuel such as an oil and relates in particular to a process and apparatus for recovering alkali salts and/or water soluble organics from water effluents from hydrothermal conversion processes of organics such as biomass and/or organic waste and/or other organic materials such as bitumen or lignite coal into oil in hot pressurized water. Another aspect of the invention relates to an integrated process for effective production of oil by conversion of slurries of biomass and/or organic waste and/or other organic materials such as bitumen or coal in hot pressurized water, wherein alkali salts and/or water soluble organics are recovered from the water effluent and is at least partly recycled to the feeding step thereby resulting in both a cleaned water effluent from the process as well as an overall more effective and economic process.

BACKGROUND OF THE INVENTION

The world's energy demand are ever increasing and the fossil fuel sources are being depleted, leading to increasing competition for the available energy sources, and thereby hampering economic growth by high energy prices. To overcome this situation renewable energy resources such as wind, solar and biomass must be brought into exploitation.

The rapid increase in global energy demand makes the search for new energy sources a major concern, and as a consequence, there is a big interest in the production and use of renewable energy.

Biomass and waste in various forms is a huge source of renewable energy, and utilization of biomass, in contrast to utilization of fossil resources such as oil and gas, does not cause a net increase in atmospheric $CO_2$. The increasing level of $CO_2$ in the atmosphere is by most scholars considered to cause global warming (e.g. Karl and Trenberth, 2003). There is globally a large and increasing demand for liquid fuels produced from biomass, not only for environmental reasons, but also for pure economical ones due to increasing oil prices and security of oil supply (International Energy Outlook, 2008).

Several processes for thermal transformation of biomass to liquids with fuel properties exists, however most of them are carried out on dry biomass such as pyrolysis. Pyrolysis is the process of thermochemical transformation of biomass under non-oxidative conditions (e.g. Yaman, 2004). Typical pyrolysis conditions are 500-520° C. for most forms of woody biomass (Demirbas, 2007). Other thermal processes for liquid fuel production include Catalytic depolymerization (CDP) and biomass gasification combined with Fischer-Tropsch synthesis (BG-FT) (Laohalidanond et al., 2006)

Many of the above mentioned processes are not optimal for wet feeds. However, many biomass based materials, such as wet grains from ethanol or beer production, bagasse from sugar production, or sludges such as manure fibres from live stock production contain a large fraction of water. To remove the water by evaporation consumes a considerable amount of energy. In hydrothermal gasification and liquefaction processes aqueous biomass is directly converted to oil, water soluble organic substances, gas and minerals at sub- or supercritical critical conditions (Srokol et al., 2004; Karagoz et al., 2006; Elliott et al., 1991; Sealock et al., 1993).

The presence of alkali's such as potassium and sodium are well known to be beneficial for degradation and conversion of organic macromolecules in the feed. Such alkalis are often present in the organic feed and sometimes additional alkalis are added to the feed to enhance the conversion (Iversen et al, 2006, Zhong et al., 2002; Feng et al., 2004; Karagöz et al., 2005).

Iversen et al (WO2006/1170002A3) further control the pH of the of feed during the conversion process, and apply a heterogeneous catalyst to further control the conversion process to oil.

However, common for such hydrothermal conversion processes is that at least part of the organics in the feed ends up as water soluble organics in the water effluent. Typical such water soluble organics may comprises alcohols, phenols, amines, amides, acids, ketones, ethers, esters and aldehydes of c1-c10 hydrocarbons. Depending on the specific process configuration, feed and operating conditions up a significant amount of the carbon and energy content in the feed may end up as water soluble organics. Thereby a polluted water effluent is created, which needs to be purified in order to provide an environmentally sustainable process. Further it is advantageous and very desirably to recover these water soluble organics as the process becomes more efficient both energy wise and economically.

As mentioned above the presence of alkali's such as potassium and/or sodium are beneficial for the conversion process. Alkali's are often present in feeds relevant for the present invention, but it is often desired to add additional alkali's for further enhancing the conversion process. However, alkali salts are relatively expensive, and constitute a major operating cost of conversion process. Hence, it is desirable to at least partly recover alkali salts from the process.

Hence an improved conversion method and apparatus would be advantageous.

OBJECTS OF THE INVENTION

An object of the invention is provide a method/process for recovering alkali and/or water soluble organics from water effluents from hydrothermal conversion processes of organics such as conversion of biomass and/or organic waste in hot pressurized water, which are more effective and/or economical than the prior art e.g. by recovering more energy from said feed e.g by resulting in higher yields and/or by reducing operating costs.

Another objective may be to provide a method/process to improve the processability of the feed e.g. the viscosity of the feed at a specific specific dry solid content and/or to reduce the amount of char and tar produced during said conversion process and/or for producing an oil with improved quality.

It is a further object of the present invention to provide an alternative to the prior art.

A still further object of the present invention may be to provide an apparatus that solves the above mentioned problems with in the prior art.

Furthermore an object of the present invention is to provide an integrated process for more effective and/or economical production of oil, gas, minerals and a cleaned water stream that may be used for irrigation and/or led to sewer.

SUMMARY OF THE INVENTION

Thus, the above described object and several other objects are intended to be obtained in a first aspect of the invention by providing a method for converting organic material into a hydrocarbon based fuel, such as an oil, the organic material being during conversion contained in a feed mixture of at least the organic material and a first fluid comprising or being water, method comprising the steps:

pre-treating the organic material at least by adding to the mixture at least one homogeneous catalyst comprising a compound of at least one element of group 1A of the periodic table;

converting the organic material by
heating and pressurising the feed mixture in the presence of the homogeneous catalyst to preferably 250-500° C. and preferably 50-400 bar, and subsequently cooling and expanding the mixture preferably to 25-90° C. and ambient pressure thereby the fluid comprising converted organic material separating at least a residual fraction and a fraction comprising hydrocarbon based fuel.

By ambience is preferably meant the atmospheric conditions outside the apparatus in which the method is carried out.

The method may preferably further comprise the step of recovering substances from the residual fraction. In this connection, it should be mentioned that "recovering" is used in a broad sense and covers preferably not only recovery of added substances but also substances that are produced or released from the organic material.

The homogeneous catalyst is a major operating cost. Hence, in a preferred embodiment of the present invention said step of recovering substances comprises or further comprises recovering a catalyst fraction comprising said at least one homogeneous catalyst comprising a compound of group 1A of the periodic table.

A preferred embodiment may further comprise introducing, such as by re-circulating, the catalyst fraction to the pre-treating step in such a manner that the catalyst fraction is mixed into the feed mixture.

The amount of catalyst recovered and mixed into the feed mixture may according to the present invention be more than 50 wt %, such as more than 60 wt %, preferably more than 70 wt %, such as more than 80 wt % or preferably more than 90 wt % of the total amount of homogeneous catalyst in the feed mixture measured after the pre-treatment step. Hence, said embodiment of the present invention results in a method which improves the overall process economy and/or allows higher homogenenous concentrations of said homogeneous catalyst to be used in an economical manner.

During said conversion step of organic material part of the carbon and the energy contained in said organic material is converted to water soluble organics such as alcohols, phenols, amines, amides, ketones, ester and aldehydes in the residual fraction e.g. in a water effluent after said separation step. Typically 10-50% such as 15-40% of the energy contained in said organic material is converted into water soluble organics. The formation of these water soluble organics compounds represents a process loss and put further requirements to the purification of the water effluent.

Hence, in another preferred embodiment according to the present invention said step of recovering substances from said residual fraction comprises or further comprises recovering a fraction comprising water soluble organics. The embodiment may further comprise introducing, such as by re-circulating, the recovered water soluble organic compounds to the pre-treating step in such a manner that the organic compounds are mixed with the feed mixture.

The amount of organic compounds recovered and mixed into the feed mixture is often more than 50 wt %, such as more than 60 wt %, preferably more than 70 wt %, such as more than 80 wt % or preferably more than 90 wt %, such as 95 wt % of the water soluble organics in the residual fraction.

The recovery and recirculation of water soluble organics in said step of recovering substances from said residual fraction results in a higher yields of other products from said organic material e.g. a higher mass yield of oil per mass of organic material feed to the process and/or a higher mass yield of gas per mass of organic material feed to the process and/or a higher energy yield of oil per energy contained in said organic material feed to the process and/or a higher energy yield of gas per energy contained in said organic matter feed to the process. Hence, this embodiment of the present invention results in a method which is more effective and/or economical than the prior art. It has further been found that the recirculation of said fraction comprising recovered water soluble organics to said pretreatment step according to the present invention, improves the processability of the organic material feed to the process and results in a more fluid oil.

The step of recovering substances is according to the present invention performed by an evaporation and/or distillation technique. In a particularly preferred embodiment according to the present invention said evaporation and/or distillation technique comprises a vapour compression technique such as a mechanical vapour recompression and/or a thermal vapor recompression technique. Such vapour compression evaporation and/or compression distillation techniques are based on the principle that the vapor from the evaporation and/or distillation is compressed and thereby results in an increase of the condensation temperature of vapor produced. This allows that the same vapor can be used for heating and evaporating the residual fraction according to the present invention, and thereby resulting in a very energy efficient evaporation and/or distillation technique.

The vapour compression may be performed by a mechanically driven compressor and/or blower (mechanical vapour recompression) or by an ejector driven by e.g. high pressure steam or a combination thereof.

The evaporation and/or distillation technique according to the present invention may comprise one or more falling film evaporator(-s) each equipped with a recompression technique.

A preferred embodiment according to the present invention further said step of recovering substances further involve recovering both said at at least one homogeneous catalyst and said water soluble organics in the same fraction and recirculation these to said step of pretreating.

The mass of said fraction containing substances recovered in said recovering step and being recirculated to said step of pretreating compared to the mass of the residual fraction may according to the present invention be in the range 2 to 15 such as in the range 3 to 10 and preferably in the range 4 to 8.

The step of recovering substances may according to the present invention comprise and/or further comprise a biological water treatment step for recovering water soluble organics from said residual fraction e.g. in the form of a sludge. Said sludge may be recirculated to said step of pretreating. The biological water treatment step may advantageously be located after said evaporation and/or distillation technique and being treating the distillate fraction from said recovering step.

An embodiment of the present invention may further comprise a separation of a gas fraction and an particle/ash fraction as part of said step of separating. Said separation of liquids, gas and particles/ash may according to the present invention be performed by venting off gas, settling such gravitational settling, or by use of hydrocyclones or by centrifugation, preferably in series, or combinations thereof.

The conversion according to the present invention is preferably carried out as a continuous conversion process.

Furthermore an embodiment of the present invention further comprise a step of contacting, after pressurisation and heating, said feed mixture with a heterogeneous catalyst comprising a compound of at least one element of group IVB of the periodic table and/or alpha-alumina.

The pre-treatment may according to the present invention further comprise measuring the pH of the feed mixture and adjusting the pH of the feed to a pH in the range 6.5 to 12 such as at a pH in the range 7 to 11, and preferably in the range 7.5 to 10 and even more preferably in the range 8.0 to 9.5 if the measured pH is not within the specified limits. The measuring and adjusting pH may further include assuring, e.g. measuring and adjusting, a pH in the range 6.5 to 12 such as at a pH in the range 7 to 11, and preferably in the range 7.5 to 10 and even more preferably in the range 8.0 to 9.5 if the measured pH is not within the specified limits during the conversion, e.g. until before the step of separation step is executed.

The organic material being treated according to the present invention may be Selected from from the group consisting of sludge, such as sewage sludge, liquid manure, corn silage, clarifier sludge, black liquor, residues from fermentation, residues from juice production, residues from edible oil production, residues from fruit and vegetable processing, residues from food and drink production, leachate or seepage water, brown coal, lignite, peat, bagasse, molasses, vinasses, residues from palm oil production, green house waste, grasses, straw, husk, stems, agricultural waste, household waste, algae or a combination thereof.

Further the homogeneous catalyst used according to the present invention comprises potassium and/or sodium and typically in the form of one or more water soluble salts selected from the group consisting of KOH, $K_2CO_3$, $KHCO_3$, NaOH, $Na_2CO_3$ or $NaHCO_3$ or a combination thereof. The concentration of the homogeneous catalyst may be at least 1% by weight, such as at least 1.5% by weight, and preferably at least 2% by weight, such as at least 3% by weight, and even more preferably above 4% by weight, such as at least 5% by weight.

In addition to the homogeneous an embodiment of the present invention the step of converting the organic material comprises contacting said feed mixture containing said organic material and homogeneous catalyst with a heterogeneous catalyst comprising a compound of at least one element of group IVB of the periodic table and/or alumina after pressuring said feed mixture to a pressure of at least 50 bar such as at least 100 bar and preferably at least 150 bar and preferably at least 225 bar such as 250 bar and even more preferably a pressure in the range 250-320 bars, and a temperature of at least 300 C such as in the range 350 to 450 C and preferably in the range 360-400 C before said contacting step. The at least one element of group IVB of the periodic table such as zirconium and/or titanium and/or alumina is/are preferably at least partly on an oxide and/or hydroxide form and/or sulphate and/or phosphate form. The heterogeneous catalyst may further comprise at least one element selected from the group consisting of Fe, Ni, Co, Cu, Cr, W, Mn, Mo, V, Sn, Zn, Si, Pt, Ru in an amount up to 20% by weight, such as an amount up to 10% by weight, preferably in an amount up to 5% by weight, such as up to 2.5% by weight or a combination of these elements.

The heterogeneous catalyst according to the present invention is preferably in the form of a monolith or honey comb structure wherein said heterogeneous catalyst is at least partly contained in a reactor wherein said reactor is a fixed bed reactor.

In another aspect, the invention relates to an apparatus for converting organic material into a hydrocarbon based fuel, such as an oil, the organic material being during conversion contained in a feed mixture of at least the organic material and a first fluid comprising or being water, the apparatus comprising:

pre-treating means in which a pre-treatment of the organic material is carried out at least by adding to the feed mixture at least one homogeneous catalyst comprising a compound of at least one element of group 1A of the periodic table;

a conversion stage for converting the organic material and comprising
heating and pressurisation means for heating and pressurising the mixture in the presence of the homogeneous catalyst to preferably 250-500° C. and preferably 50-400 bar, and
cooling and expansion means for cooling and expanding preferably to 25-90° C. and preferably ambient pressure the mixture after the heating and pressurisation whereby the mixture comprising converted organic material separation means for separating from the mixture at least a residual fraction and fraction comprising hydrocarbon based fuel.

The apparatus may preferably further comprise recovery means for recovering substances from the residual fraction.

The first and second aspect of the present invention may each be combined with any of the other aspects. These and other aspects of the invention will be apparent from and elucidated with reference to the embodiments described hereinafter.

Further embodiments and advantageous effects of the present invention is presented in the accompanying dependent claims and the following description of the invention.

Throughout this document the terms "comprising" or "comprises" do not exclude other possible elements or steps. Also, the mentioning of references such as "a" or "an" etc. should not be construed as excluding a plurality.

BRIEF DESCRIPTION OF THE DRAWINGS

The method and apparatus according to the invention will now be described in more detail with regard to the accompanying figures. The figures show one way of implementing the present invention and is not to be construed as being limiting to other possible embodiments falling within the scope of the attached claim set.

EMBODIMENTS OF THE INVENTION

Figure 1:
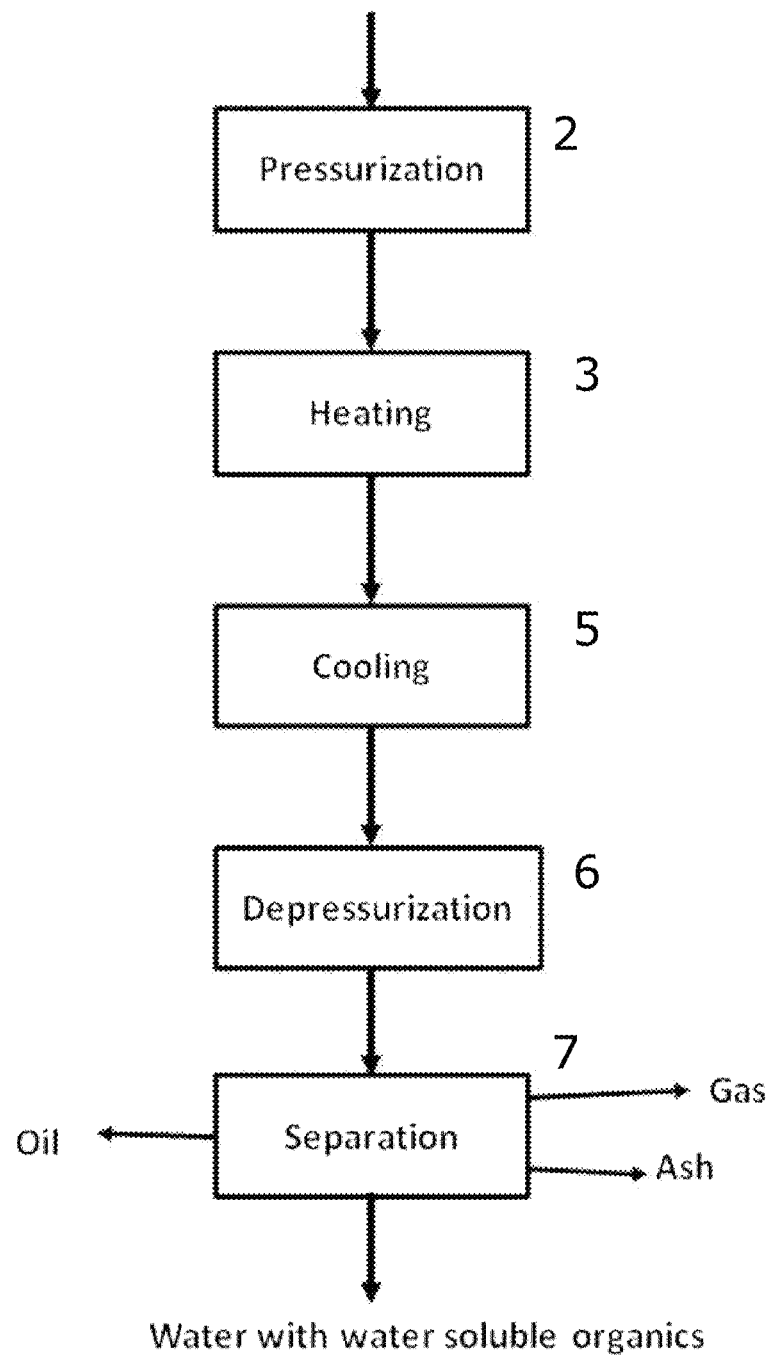
FIG. 1 shows schematically a flow diagram of a conversion process according to the present invention.

FIG. 1 shows a simplified flow diagram of a continuous hydrothermal process for conversion of organic materials and/or waste. Depending on the character of the organic material, the organic material to be pre-treated in a first step to be size reduced and subsequently slurried in a water to make it pumpable. The feed is pressurized to a pressure in the range 50-500 bar by a pump 2 and subsequently heated to a reaction temperature in the range 250-500 C in the heater 3, and maintained at the reaction temperature for a certain period of time. Thereafter the fluid mixture is cooled in the cooler 5, depressurized 6, and separated into the products oil, gas, water with water soluble organics, and ash in a separation system 7. The distribution of the specific products generally depends on specific process and factors such as the actual feed composition, concentration of said organic material, heating rate, residence time, temperature, pressure, pH, presence of different homogeneous and/or heterogeneous catalysts and/or reaction intermediates during all or part of said conversion process.

Figure 2:
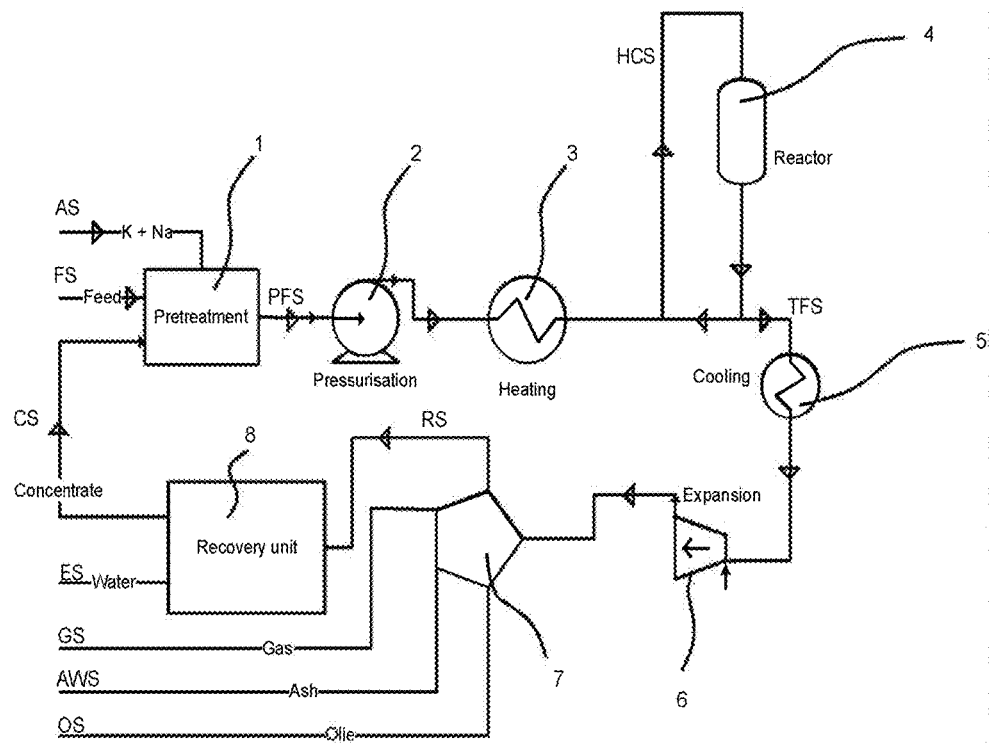
FIG. 2 shows a schematic drawing of an embodiment of the conversion process according to the present invention.

FIG. 2 is a schematic drawing of the conversion process according to the present invention. Organic material for conversion is received from a feed storage (not shown on the figure). Said organic material may comprise a wide range of biomass and wastes, and may also comprise fossil fuels such coal, brown coal, peat, shale, orimulsion, heavy fractions of crude oil etc. An aqueous solution containing the organic material, the feed stream FS, is pumped to the pre-treatment vessel 1.

The pre-treatment comprises in many embodiment of the present invention an adjustment of the pH in the range 6.0 to 14 such as a pH in the range 6.5 to 12 and preferably a pH in the range 7 to 12, and more preferably in the range 7.5 to 10 and even more preferably in the range 8.0 to 9.5. This pH control and adjustment is in many embodiments according to the present invention performed by measuring pH in the water phase after said separation step and/or by adding additives to the vessel either directly into the pre-treatment vessel, e.g. by adding a base, which may also comprise an element of group IA of the periodic table. Non-limiting examples of such additives are KOH, NaOH, $K_2CO_3$, $Na_2CO_3$, ash from biomass or coal combustion. Such additives may be added to the pre-treatment vessel 1 through an additive stream AS streaming into the vessel 1. Examples of such additives are ammonia and/or urea.

During the residence in the pre-treatment vessel larger molecules such as cellulose, hemicellulose and lignin are hydrolyzed, and cells from biomass addition is opened facilitating the release of cell contents, such as salts. For a number of potential feedstock this cell opening involves release of catalysts such as potassium from the feedstock itself, thereby allowing for a very efficient process. A number of other additives may also enhance the pre-conversion of the organic material and are further advantageous for the subsequent processing. Such other additives include alcohols, such as methanol, carboxylic acids, aldehydes, and/or ketones.

A pre-treated feed stream PFS containing pre-treated organic material is withdrawn from pre-treatment vessel 1 and pressurized by pressurizing means 2 to a first pressure P1, e.g. 250 bars.

After pressurization the pre-treated stream PFS is heated by heating means 3 to a first temperature T1, e.g. 320 C. During this heating the organic material in the pre-treated stream is further thermally decomposed.

The pre-treated stream PFS is mixed with a re-circulating stream HCS flowing through the catalytic reactor 4. After mixing the pre-treated stream PFS with the recirculation stream HCS the mixed solution enters the catalytic reactor 4.

In the catalytic reactor 4, the pre-treated stream PFS containing homogeneous catalyst and pre-converted organic material is contacted with the heterogeneous catalyst. The heterogeneous catalyst will typically be contained in a tubular fixed bed, and the catalytic reactor may comprise multiple tubular fixed beds. During the conversion a dissolved fuel gas, a water soluble organics and an oil is generally produced. The product distribution is adjustable within a wide range of concentration of resulting products as shown in the examples below, and may be controlled by selecting a suitable combination of residence time, re-circulation flow rate, reaction temperature, and concentration of homogeneous catalyst and additives.

Part of the recirculation stream HCS from the catalytic reactor is re-circulated and mixed with the pre-treated stream PFS as described above.

The remaining part of the recirculation stream HCS corresponding to the mass flow of the pre-treated stream PFS before mixing with the recirculation stream HCS stream is withdrawn, this remaining part, the treated feed stream TFS, then enters cooling means 5 where the treated feed stream TFS is cooled to a second temperature T2, e.g. 50 C.

Figure 3:
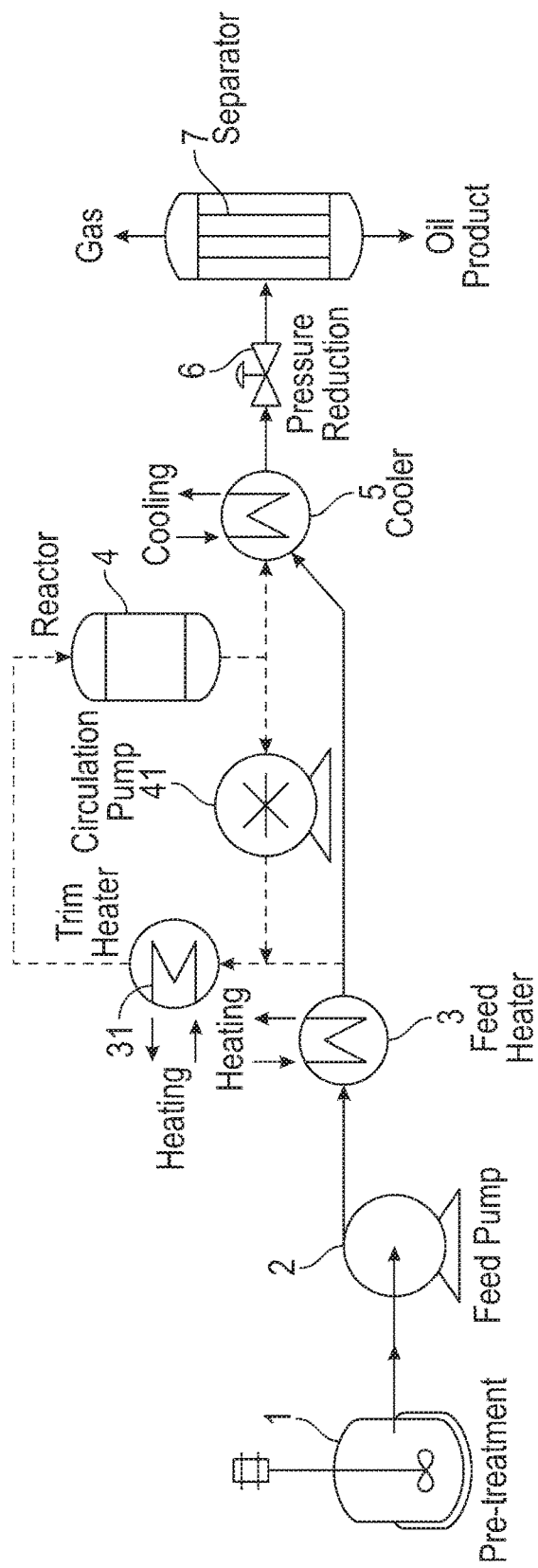
FIG. 3 shows a schematic diagram of an embodiment of a hydrothermal process for conversion of organics such as biomass and waste according to the present invention.

Although the invention as disclosed e.g. in FIG. 2 and FIG. 3 is shown as comprising contact with a heterogeneous catalyst (in FIG. 2 the heterogeneous catalyst contact occurs in reactor 4) this contact may be omitted and the reactor left out of a process plant according to the present invention. Often the heterogeneous catalyst is used to obtain a certain conversion yield, composition and/or quality of the hydrocarbon based fuel and in many instances the requirement as to the fuel produced is that it is burnable for instance in a power plant and such a burnable fuel may be produced without the heterogeneous catalyst although the oil yield and the oil quality has a tendency to be lower than what is obtained by use of the heterogeneous catalyst.

Subsequent to the cooling in this embodiment of the invention the treated feed stream TFS enters expansion means 6, where the treated feed stream TFS is expanded to a second pressure P2, e.g. atmospheric pressure.

The treated feed stream TFS is subsequent to the expansion lead into separation means 7 such as a liquid trap with gas venting, different liquid outlets and possibilities for sediment filtration, where the treated stream is separated into an oil stream OS, a ash waste stream AWS, a gas stream and a recovery stream RS. The separation means 7 could alternatively be settling tanks, centrifuges etc. The recovery stream RS subsequently enters a recovery unit 8, such as a mechanical vapour recompression (MVR) unit for separating the recovery stream RS into an effluent stream ES comprising water having a significant reduced level of water soluble organics and with suspended matter reduced below a limit for additional payment or in an acceptable range for leading it to a public sewer system. In addition, a further water purification may be provided to obtain specific requirements e.g. tap or process water quality.

The remaining part of the recovery stream RS, when the effluent stream ES has been withdrawn, is the concentrate stream CS, which is fed back into the pre-treatment vessel 1. The concentrate stream CS comprises homogeneous catalysts from group IA such as KOH, NaOH, $K_2CO_3$ or $Na_2CO_3$ the alkali content of the catalyst is not necessary the same as when added to the feed stream in the pre-treatment vessel, which were added in the additive stream AS like described above thereby minimizing the needed amounts of supplied additives in the additive stream AS.

FIG. 3 shows a simplified flow diagram of a continuous hydrothermal process for conversion of organic materials and/or waste. The process is similar to the process disclosed in connection with FIG. 2. Depending on the character of the organic material, the organic material to be converted may in a first step be size reduced and subsequently slurried in a water to make it pumpable. The feed is pressurized to a pressure in the range 50-400 bar by the pump 2 and subsequently heated to a reaction temperature in the range 2500-500 C in the heater 3, and maintained at the reaction temperature for a certain period of time. Thereafter the fluid mixture is cooled in the cooler 5, depressurized 6, and separated into the products oil, gas, water with water soluble organics, and minerals in a separation system 7. The distribution of the specific products generally depends on specific process and factors such as the actual feed composition, concentration of said organic material, heating rate, residence time, temperature, pressure, pH, presence of different homogeneous and/or heterogeneous catalysts and/or reaction intermediates during all or part of said conversion process.

As indicated in FIG. 3 with the dotted line connecting the outlet of the reactor to the outlet pipe of the feed through a circulation pump 41, recirculation may be made optionally. In the mixing between the stream from the reactor 4 and the feed a fast temperature increase can be obtained that may result in that unwanted reactions otherwise occurring due to slow temperature increase is avoided. To increase the temperature of the feed to the final temperature (reaction temperature) at which it is to enter the reactor 4, the trim heater 31 is active and its purpose is inter alia to adjust the temperature to the desired temperature of the feed before it enters into the reactor 4.

The solid line connecting the feed heater 3 with the cooler 5 indicates that contact with heterogenous catalysts may be left out in some embodiments.

Again, FIG. 2 and FIG. 3 show schematic layouts of preferred embodiment of a hydrothermal process for conversion of organic materials. Although reference is made to these figures, the following features are considered as not being linked only to embodiments resembling FIG. 2 or 3. The number of different organic materials that can be converted is high and may include biomass and waste contained or slurried in a fluid into hydrocarbons. In addition, the organic material may comprise a wide range of biomass and waste materials e.g. in the form of a solid material and/or a sludge and may also comprise organic fluids and materials, which are present as a liquid and/or is soluble and/or mixable with the fluid. Non limiting examples of organic materials according to the present involve sludges such as sludge from biological treatment of waste waters such as sewage sludge, manure, corn silage, clarifier sludge, black liquor, residues from fermentation e.g. wet distillers grain from ethanol production, residues from food production such as residues from olive production, residues from edible oil production, residues from food and drink production e.g. grape residues, leachate or seepage water, algae etc. Further said organic material may comprise a lignocellulotic materials e.g. selected from the group consisting of biomass such as agricultural and/or plant residues such as straw, grasses, stems, wood, wood chips, saw dust, thinnings, leaves, wine trash, lignin, cellulose, hemicelluloses, sugar(s), starch, protein and energy crops like jatropha, miscanthus. Still further said organic material may comprise a waste stream such as house hold waste, municipal solid waste, paper waste, auto shredder waste, plastics, rubbers, scrap tires, risk material from meat and bone meal processing, meat and bone meal, CCA treated wood, chemical waste such as halogenated organic compounds, used oils, fats, organic solvents etc. In many aspects of the present invention the organic material may be a mixture of different sources of organic materials.

The fluid typically comprises water and/or a mixture of water and one or more other organic fluid(s) such as alcohol(s), carboxylic acid(s), aldehyde(s), ketone(s), ester(s), ether(s), amino acid(s), amine(s) and/or a hydrocarbon such as an oil and/or a fat and/or a fatty acid. Said organic fluid(s) may be added to said feed and/or may be recovered from the products and/or intermediate products Depending on the character and composition of the specific feed stream(s) FS to be converted, the feed stream FS may first undergo a preconditioning and/or pre-treatment in the pre-treatment vessel 1 so as to make the fluid containing the organic feed material pumpable. Said pre-treatment may first involve a size reduction and size control step of the feed e.g. by cutting, grinding, milling and/or sieving of said material. The size reduction and size control step may be an integral part of a feed pump (not shown). Typically the maximum particle size of said feed material after said size reduction step may be maximum 50 mm such as a particle size of maximum 30 mm, and preferably a particle size of maximum 15 mm such as a particle size of maximum 10 mm, and even more preferably a particle size of maximum 5 mm such as a maximum particle size in the range 0.5 to 5 mm. The maximum particle size may be controlled or further controlled by a sieving and/or filtering step subsequent or integrated with a particle size reduction step.

The pre-treatment may comprise or further comprise addition of water, organic fluid(s), enzymes, addition of homogeneous catalysts such as alkali salts such as potassium and/or sodium salts as well as a pH control and adjustment to maintain a specific pH during said hydrothermal conversion process. Often the pre-treatment also involves preheating of the feed mixture to a temperature in the range 80-230 C, such as a temperature in the range 100-200 C, and preferably a temperature in the range 100-185 C at a pressure high enough to maintain the feed mixture below the boiling point i.e. at a pressure in the range 2-25 bars such as a pressure in the range 4-20 bars. The preheating, mixing and addition of water and/or other organic solvents and/or homogeneous catalyst is/are preferably performed in a stirred vessel. The energy needed for the preheating of said feed is preferably supplied by recovering heat from one of the process streams to be cooled (not shown).

In many preferred embodiments, the first heat exchanger 3 may be integrated into the stirred vessel.

During the pre-treatment or preconditioning particularly hydrolysis and/or depolymerisation and/or decarboxylation type of reactions partly decompose the organic macromolecules into smaller molecules, thereby normally also lowering the viscosity of the fluid mixture, thereby making the feed easier to pump and/or allowing for operation at higher concentrations of dry matter.

In many embodiments of the present invention, the conversion or partly conversion of said organic material is performed in the presence of one or more homogeneous catalyst(s) and said one or more homogeneous catalyst(s) are preferably added to said feed in the pre-treatment vessel 1 and/or subsequent to said pre-treatment and before further heating of the feed.

One homogeneous catalyst preferably added or controlled according to the present invention comprises an alkali salt such as a potassium and/or a sodium salt. Preferred alkali salts according to the present invention includes $K_2CO_3$, KOH, $Na_2CO_3$, NaOH, but other alkali salts may be used in combination with a suitable base for adjustment of pH as further described below. Other suitable bases include ammonia and urea.

The presence of alkali's such as potassium and/or sodium is believed to accelerate the decomposition of the organic macromolecules, and further often have an important catalytic function for the conversion processes during heat up and in the further conversion process either alone or in combination with other homogeneous catalysts as further described below.

The amount of alkali salt addition required according to the present invention depends on the specific organic material(s) in the feed, the amount and the composition of organic material(s) in feed, and in particular the concentration of potassium and/or sodium in the feed.

In many embodiments of the present invention the weight fraction of the alkali salt to the amount of dry matter in the feed (DM) is at least 0.025 such as at least 0.05, and preferably at least 0.1 such as at least 0.2, and even more preferably at least 0.3, such as at least 0.5.

Potassium salts is particularly attractive as alkali source for applications, wherein the mineral product from the process is used as a fertilizer or as a precursor for a fertilizer.

$CO_2$ and/or CO are important reaction products from said decomposition and/or decarboxylation and/or deoxygenation reactions occurring during said pre-treatment and/or preconditioning and during said subsequent pressurization and heating. Further $CO_2$ and/or CO are reactants in a number of gas reactions including water gas shift, steam reforming and a number gas phase reactions.

By controlling the pH value at alkaline the gaseous equilibrium is changed towards hydrogen production, the production of $CO_2$ in gas phase is reduced by the l'Chatelier principle. Instead the presence of carbonates/bicarbonates inhibits the formation of coke, tar and char e.g. via furfurals from sugar compounds. Further it is believed that it accelerates steam reforming reactions, the production of liquid fuels by Fischer-Tropsch reactions, and reduces the oxygen in the bio oil produced and thereby improves the storage stability of the bio oil produced.

Hence, according to many aspects of the present invention the homogeneous catalyst(s) added in said pretreatment and/or preconditioning step may further advantageously comprise addition and/or ensuring the presence of carbonates and/or bicarbonates e.g. by measuring and controlling the pH of the fluid through said conversion process.

According to many embodiments of the present invention it is further advantageously that the conditions for said conversion process is performed under slightly alkaline conditions i.e. at a pH in the range 6.0 to 14 during said conversion process such as at a pH in the range 6.5 to 12, and preferably in the range 7.0 to 11 and even more preferably in the range 7.5 to 10. As many of the organic materials according to the present invention is of acidic nature, said pretreatment or preconditioning step may further involve measuring the pH of said conversion e.g. by measuring the pH in said pretreatment step and/or in the water phase after said separation step.

Furthermore, by adjusting the fluid to above 7 the corrosion of the materials used for the involved components in the apparatus is considerably decreased. The corrosion of these materials has decreased to such an amount that cheap standard materials may be used for the construction of the apparatus.

According to another embodiments of the present invention the method may comprise the step of maintaining the pH value of said fluid containing said organic material in the range 6-14, such as 7-12 and preferably in the range 7-10 such as in the range 7.5-9.5. It is hereby obtained that when converting the organic material into hydrocarbon fuel the corrosion of the materials used for the involved components of the apparatus is substantial decreased to at least an insignificant amount of corrosion.

Accordingly, it may be advantageously to include in methods and apparatus according to the present invention procedures of controlling the pH typically be measuring and adjusting the pH by addition of additives.

The fluid containing the organic material to be converted is pressurized to a pressure in the range 50-400 bar such as in the range 225 to 325 bar by one or more pressurizing pump and is generally subsequently heated to a temperature in the range 250-500 C such as to a temperature in the range 300 to 450 in the heating means 3 depending of the specific organic material to be converted and/or if the desired main product is an oil, a water soluble compound and/or a gaseous product and/or a mineral product.

Many aspects of the present invention involves converting said organic material into an oil as the predominant product. In order to prevent undesired side reactions e.g. towards tar and char, the heating in the heating step is according to many embodiments of the present invention performed in a sequential manner i.e. in two or more steps with a controlled heating rate. The critical temperature range is dependent on the It has found that it is particularly critical to control the heating rate in the range from 125 C to 300 C such as in the range 150 to 290 C, and preferably in the range 200 to 280 C such as in the range 225 to 270 C, depending of the specific feed composition.

The heating rate in the critical temperature range is according to the present invention at least 50 C/min such as at least 60 C/min and preferably at least 70 C/min such as 80 C/min, and even more preferably at least 90 C/min such as at least 100 C/min.

In a preferred embodiment the heating rate in the specific temperature range is achieved by suitable design of the temperature profiles and heat transfer surfaces, and by at least partly heating said by the hot product stream being withdrawn after reaction.

According to the present invention at least one additional heating step heating the fluid to the desired reaction temperature will often be present subsequent to said first heating step(s). Said additional heating step may further comprise heating by external heating source e.g. by a heating fluid such as flue gas from a burner (not shown) and/or steam and/or electrical heating and/or by induction heating and/or by resistivity heating. The fuel for said burner may comprise or partly comprise combustible gas and/or oil produced as a product from said combustion process. Alternatively said external heating fluid may comprise steam from an external process e.g. by hot low pressure steam e.g. from a turbine. Subsequently to said additional heating step to reaction temperature suspended particles is being at least partly removed in one or more particle separation devices. Said particle separation device(s) may comprise hydro cyclone(s), inline filter(s), gravimetric settling chamber(s) or combinations thereof.

According to the present invention maintained at reaction temperature for maximum 80 minutes such as maximum 45 minutes, and preferably maximum 30 minutes such as maximum 25 minutes and even more preferably between 5 and 30 minutes such as between 10 and 25 minutes.

In preferred embodiments, the fast heating in the critical temperature range(s) is performed by mixing at least part of the hot effluent fluid after said conversion step to feed after said first heating step(s). Hereby an extremely fast heating rate through said critical temperature range is obtained. Subsequent to the mixing the fluid mixture is further heated to the desired temperature for said conversion, suspended particles removed in one or more particle separation devices, and maintained at the desired conversion temperature for a period as described above. Part of the fluid in the recirculation loop (recirculation of feed through the reactor comprising the heterogeneous catalyst) is continuously withdrawn and passes through the cooling, depressurization, separation, recovery and recirculation steps as described above.

EXAMPLE 1

Tests have been performed in a test facility as depicted schematically in FIG. 3. The test facility operated at a continuous 20 L/h capacity and results obtained with the facility are described in the following.

The organic fraction of the feed stream is converted to oil in the presence of a homogeneous ($K_2CO_3$) and a heterogeneous (Zirconia) catalyst, at subcritical conditions (280-370° C. and 225-250 bar) in the reactor 4. The raw product (as output from the reactor 4) consists of a top-phase of bio-oil, a gas-phase mainly consisting of $CO_2$, a water phase with soluble organic compounds and a bottom-phase mainly consisting of inorganic salts.

The pre-treated feed stream PFS from the feed tanks is pumped by a high pressure feed pump 2. The feed is then preheated in the heating means 3. The pre-treated feed stream PFS enters a recirculation loop, the heterogenous catalysis stream HCS, in which a recirculation pump ensures a high flow rate. This design ensures instantaneous heat up in the mixing point. The flow passes through a trim heater 31 and a fixed-bed reactor 4 filled with zirconia-catalyst. After the reactor a fraction of the heterogenous catalysis stream HCS is withdrawn and passed through a cooler 5. After pressure reduction in the expansion means 6, the oil is separated from the water by centrifugation or gravimetrical separation in the separation means 7. A schematic flow sheet is shown in FIG. 3.

Example 1: Feed Material

DDGS (Dried Distillers Grains with Solubles) and WDGS (Wet Distillers Grains with Solubles) are the major co-products of first generation ethanol production. The main components of DDGS are protein and cellulose but it also contains smaller amount of hemicelluloses and fat. The content of the elements C, N and H were determined according to ASTM D 5291 (ASTM D5291 Standard Test Methods for Instrumental Determination of Carbon, Hydrogen, and Nitrogen in Petroleum Products and Lubricants) and sulfur according to ASTM D 1552 (ASTM D1552 Standard Test Method for Sulfur in Petroleum Products (High-Temperature Method)) and shown in Table 1 below. The oxygen content was calculated from these results. The heating value of the DDGS was 18.8 MJ/kg and was determined according to ASTM D 240 (ASTM D240 Standard Test Method for Heat of Combustion of Liquid Hydrocarbon Fuels by Bomb Calorimeter). Analysis of elementary composition and heat value was carried out at Karlshamns Kraft, Karlshamn, Sweden. The DDGS used in the current work comes from Agroetanol AB, Norrköping, Sweden. Due to storage reasons DDGS was used instead of WDGS. The DDGS was milled in a dry-mill to reduce particle size to 0.5 mm. Prior to the experiments milled DDGS was mixed with water to slurries with 25% dry matter.

TABLE 1

The composition of the DDGS used in the experiments

| Elementary composition, daf* (wt %) | |
| --- | --- |
| C | 45.5 |
| H | 7.0 |
| N | 8.10 |
| S | 0.79 |
| O | 38.7 |
| Major components wt % | |
| Protein | 35 |
| Moisture | 6.0 |
| Fibers | 47 |
| Fat | 5.5 |
| Ash contents (db*) | 4.0 |
| Starch | 1.7 |

*daf, dry ash free; db, dry basis.

Example 1: Experimental Procedure $K_2CO_3$ (homogeneous catalyst) corresponding to 2.5% of the slurry mass was added. The heterogeneous catalyst in the reactor was zirconia ($ZrO_2$). The catalytic conversion of DDGS was carried out at process temperature of 350° C. and the feed rate was 11 L/h. Each trial was run for 6 h and the process was considered to be in steady-state after 4 h. Each oil yield measurement was based on the oil production during 1 h at steady-state. The oil was separated from the water phase by a disc-stack centrifuge (Alfa-Laval, Sweden).

Example 1: Oil Properties

To evaluate the bio-oil quality, density, viscosity, heat value and elemental composition were determined. The heat value was determined according to ASTM D 240 and the elementary composition according to ASTM D 5291 and 1552. The oxygen content was calculated from these results. The Conradson number, a measure of the oil stability, was measured according to ASTM D 189 (ASTM D189 Standard Test Method for Conradson Carbon Residue of Petroleum Products). The analyses mentioned above were carried out at Karlshamn Kraft, Karlshamn, Sweden. The water content was determined by Carl-Fischer titration performed with a TitraLab TIM 580 (Radiometer, France).

Example 1: Composition Analysis of Oil, Water and Gas Phase

Oil obtained from catalytic conversion of DDGS was analyzed by gas chromatograph (GC) equipped with a mass selective (MS) detector [GC-MS; Varian CP-3800; column, Varian GC Column VF-5 ms; (5% phenyl 95% dimethyl-polysiloxane, 30 m×0.25 mm×0.25 µm); temperature programmed: 75° C. (hold 2 min.) increase to 325° C. (20° C./min, hold 15 min.). The compounds were identified by means of the NIST (National Institute of Standards and Technology) library of mass spectra.

The water phase was analyzed for short-chained alcohols and acids as well as acetone by GC (Varian 3800, column: fused silica, 25 m×0.32 mm, temperature programmed: 50° C. hold 2 min. increase to 140° C., 35° C./min.). To detect other compounds such as amines and fatty acids, 24 mL of water-phase was acidified by addition of concentrated hydrochloric acid (2 mL). This made the water phase cloudy, indicating the presence of acidic organic compounds. The cloudy water phase was extracted using dichloromethane and the combined organic phases dried ($MgSO_4$) and evaporated in vacuo to give a colorless residue (240 mg, 1.0 wt %). The isolated residue was analyzed by GC-MS at the University of Copenhagen. The total organic content (TOC) in the water phase was measured by using a kit (LCK 387) and a spectrophotometrical analysis unit (DR 2800) from Hach & Lange, Germany. The gas phase was sent for analysis at Statens Provningsanstalt, Borås, Sweden.

Example 1: Results

The product from the process was a three-phase system of oil, water and salt. The oil was easily separated from water and salt by a disc-stack centrifuge.

The Oil Phase

The oil phase appeared as a black, viscous liquid, slightly lighter than water.

TABLE 2

Over-all results of the experiments, values are given with 95% confidence intervals

| | |
|---|---|
| Oil yield on dry biomass (%) | 33.9 ± 1.8 |
| Energy recovery in oil (%) | 73.2 ± 3.9 |
| Carbon recovery from biomass to oil (%) | 57.8 ± 2.8 |
| Low heating value of oil* (MJ/kg) | 35.8 ± 0.2 |
| Elementary composition of oil (%)* | |
| C | 78.3 ± 0.3 |
| H | 9.3 ± 0.1 |
| O | 5.1 ± 0.4 |
| N | 6.4 ± 0.4 |
| S | 0.4 ± 0.1 |

*corrected for the water content

TABLE 3

Properties of the bio-oil, representative sample

| | |
|---|---|
| Viscosity at 40° C., (cP) | 499 ± 52 |
| Viscosity at 60° C., (cP) | 116 ± 10 |
| Viscosity at 80° C., (cP) | 39 ± 3 |
| Water content in oil (%) | 7.2 ± 0.9 |
| Ash content in oil (%)* | 0.6 ± 0.1 |
| Conradson number | 13 ± 1 |

*Water-free

The over-all results are given in table 2 and 3, expressed as average values with 95% confidence intervals. The values are based on five separate trials. The oil yield on dry matter in the feed was 34%. The oil contained more than 6 times less oxygen than the DDGS and thus the effective heat value was almost double, 35.8 MJ/kg. As much as 73.2% of the energy in the feed was recovered in the oil. The viscosity of the produced oil was high but decreased significantly with temperature and the rheological behavior was Newtonian. The oil contained some water that could be removed by a second centrifugation. The ash content in the oil was relatively low. The stability of the oil was checked by measuring the change in viscosity, elementary composition and heat value after extended storage at ambient conditions. After 4 months of storage at ambient conditions. In addition, there was no change in elementary composition and heat value after 8 months of storage.

Figure 4:
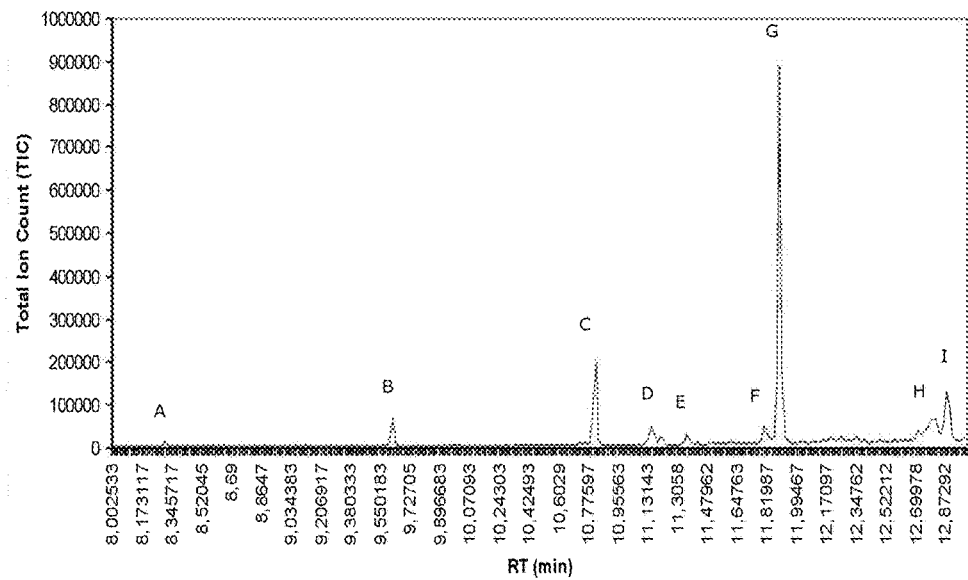
FIG. 4 shows a GC-MS spectrum of bio-oil with peak identification.
Figure 5A:
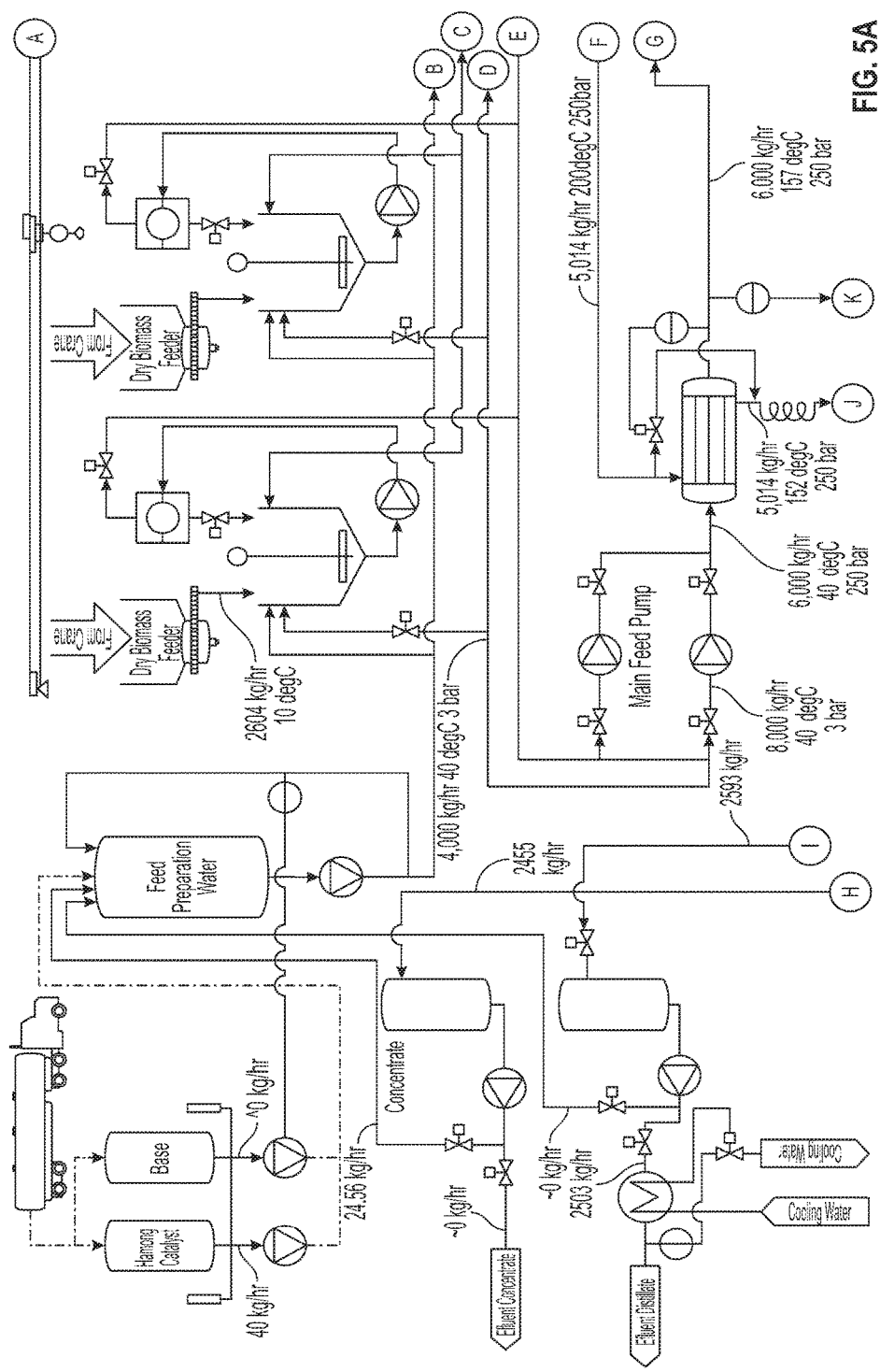
FIGS. 5A-D show a specific and complete plant for converting organic material according to the present invention.
Figure 5B:
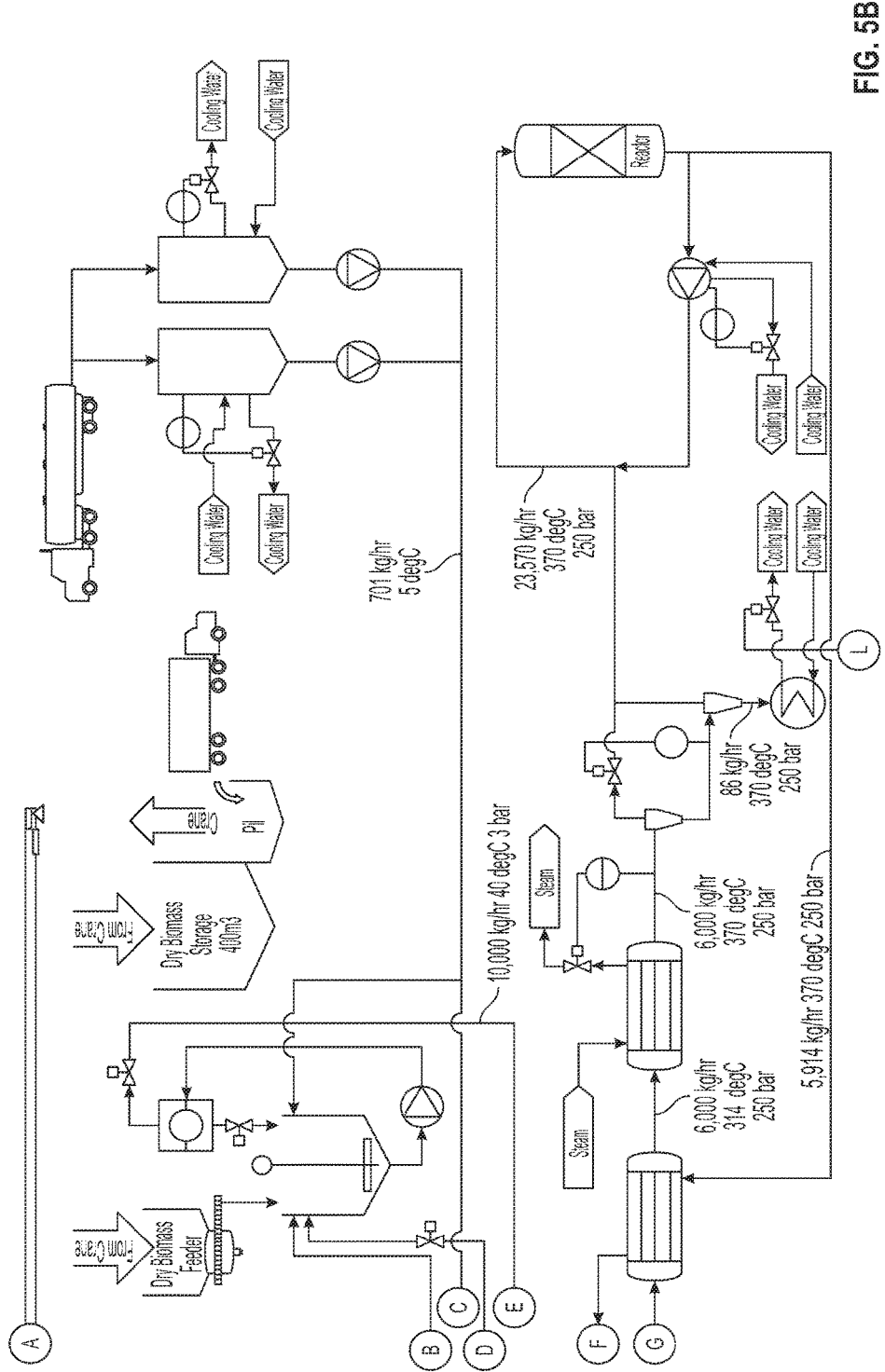
Figure 5C:
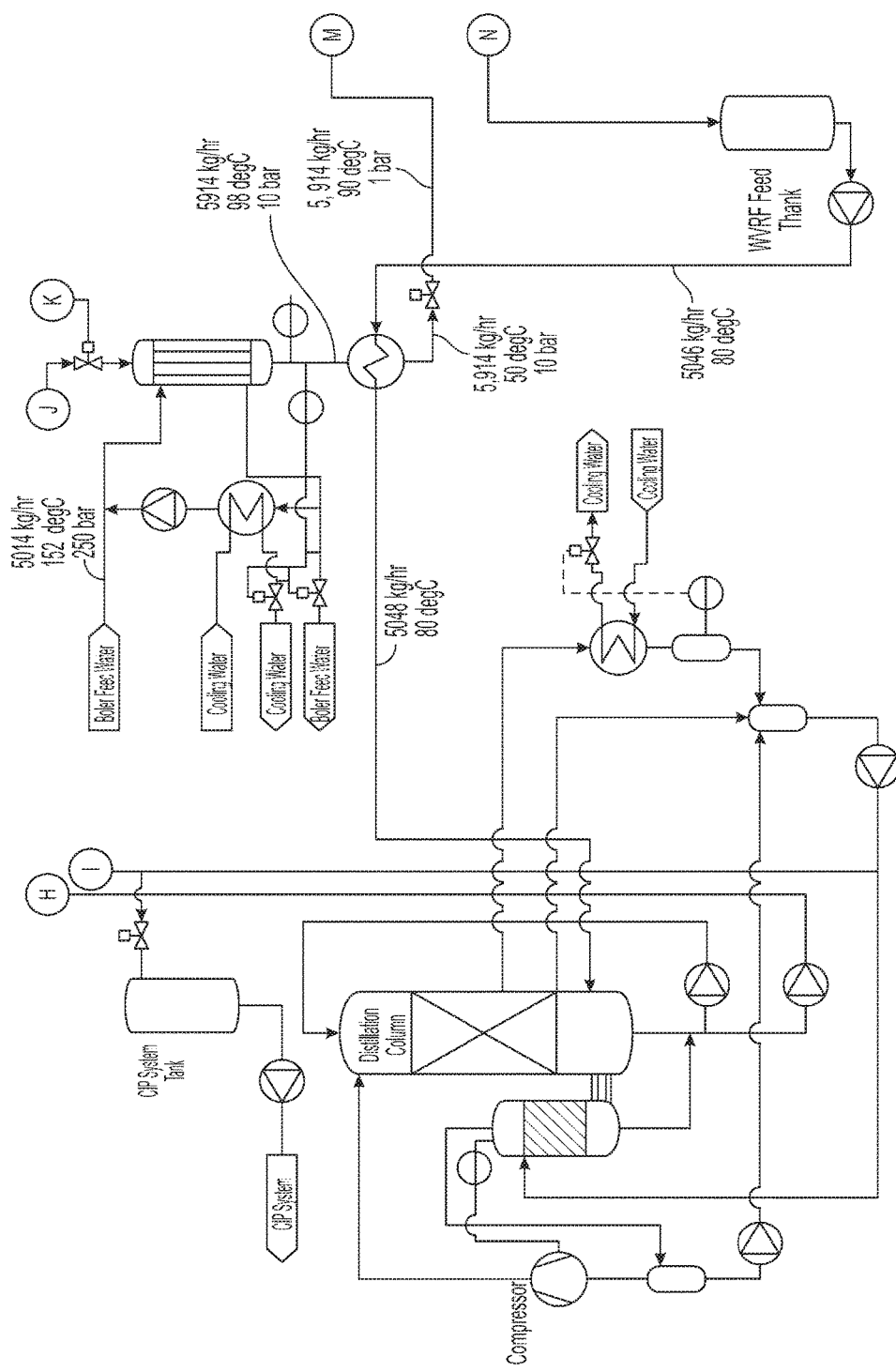
Figure 5D:
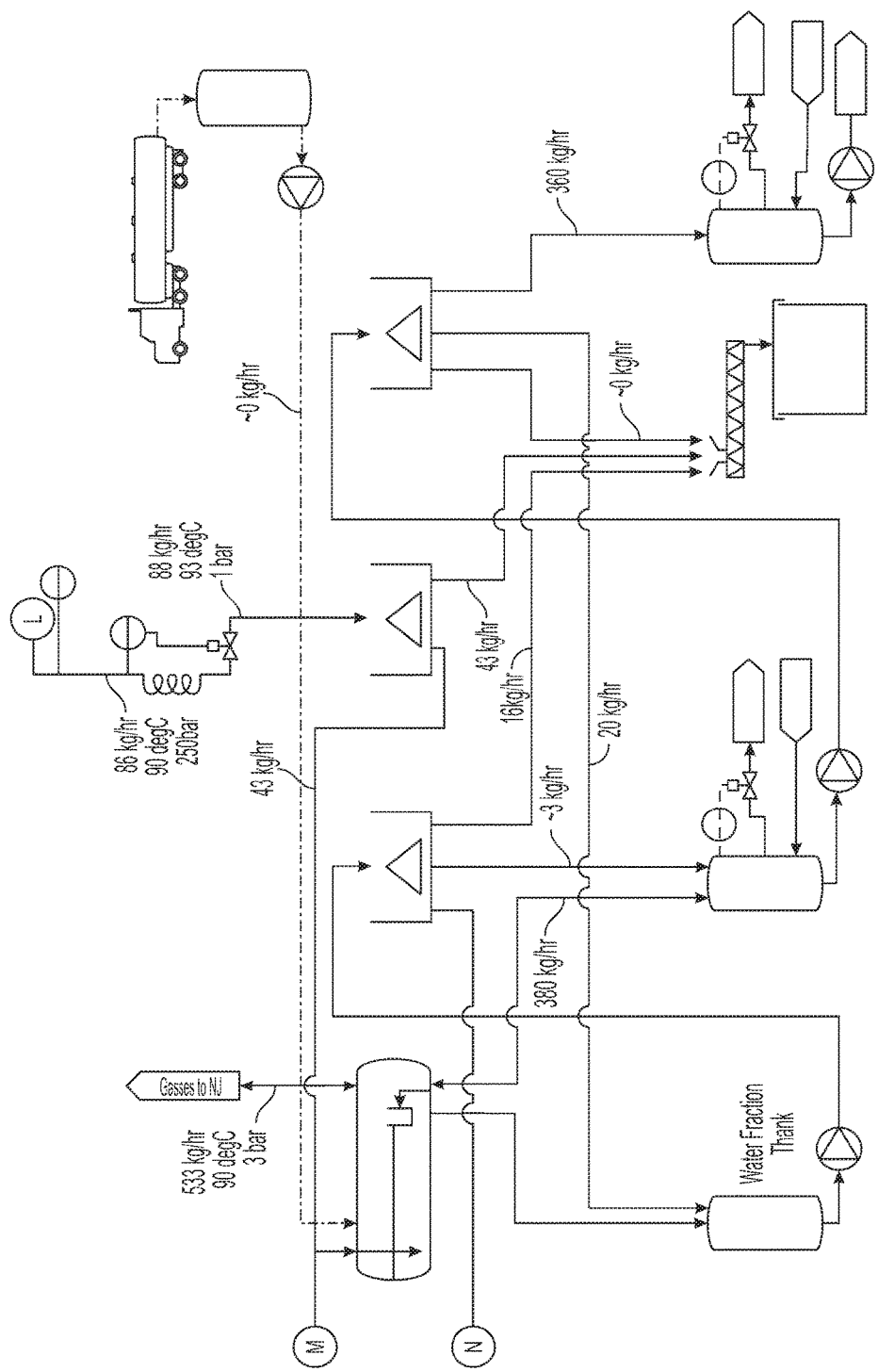

GC-MS analysis of DDGS oil was performed and the identified compounds in the oil are presented in Table 4 and FIG. 4. The oil contained a large fraction of long chain aliphatic acids such as: tetradecanoic acid, hexadecanoic acid and octadecanoic acid.

In order to determine the distribution of compounds in the oil, a semi-quantitative study was made by means of the percentage of area of the chromatographic peaks. The deviation from 100% represents the area of unidentified compounds.

TABLE 4

Identification of compounds in oil phase

| RT (min) | Compound | Area (%) |
|---|---|---|
| 8.299 | Decanoic acid | 0.571 |
| 9.616 | Dodecanoic acid | 3.039 |
| 10.809 | Tetradecanoic acid | 9.431 |
| 11.147 | Tridecanoic acid | 2.772 |
| 11.352 | n-Pentadecanoic acid | 1.216 |
| 11.790 | Palmitelaidic acid | 2.416 |
| 11.885 | Hexadecanoic acid | 37.376 |
| 12.793 | 11-cis-Octadecenoic acid | 7.006 |
| 12.873 | Octadecanoic acid | 8.071 |
| Σ Area | | 71.898 |

The Water Phase

The TOC (Total Organic Content) was 33.3±0.8 g/L, corresponding to a carbon recovery in the form of water-soluble compounds of 30%. A quantitative composition of the water is shown in Table 5. It can be seen that the content of short-chained alcohols and acids as well as acetone is 8% of the TOC content. The analysis of water-phase extract showed rather high levels of piperidone, benzamine, cyclopentenone derivates and heptanoic acid, however only enough to account for about 10% of the TOC.

TABLE 5

The concentration of short-chained alcohols and acids in a water phase from one of the experiments

| Compound name | Quantity (mg/L) |
| --- | --- |
| Methanol | 252 |
| Ethanol | 290 |
| 1-Propanol | 40 |
| Butanol | 40 |
| Acetone | 110 |
| Acetic acid | 3320 |
| Propionic acid | 727 |
| Butanic acid | 305 |
| Valeric acid | 230 |
| Isovaleric acid | 241.23 |

The Gas Phase

The gas contained about 95% $CO_2$ and 1.6% $H_2$, small amounts of $N_2$, CO and $CH_4$ as well as traces of short-chain alkanes and alkenes. The product gas flow was about 350-410 L/h corresponding to a carbon recovery from biomass to gas of about 12%.

Example 1: Discussion

Catalytic liquid conversion of DDGS was performed in a 20 L/h continuous pilot-plant (as depicted in FIG. 3) at subcritical conditions 350° C. and 250 bar in the presence of homogeneous $K_2CO_3$ and heterogeneous $ZrO_2$ catalysts.

The oil produced contained mainly long chain aliphatic acids and the oil yield on DDGS was 34% (w/w). More importantly, 73% of the energy in the DDGS was recovered in the oil. During the process more than 80% of the oxygen was removed. The oil had an effective heat value of 36 MJ/kg, not far from that of commercial diesel (42 MJ/kg, effective), and significantly higher than that of ethanol (28 MJ/kg, effective).

Only compounds corresponding to about 20% of the TOC could be identified with GC and GC-MS (e.g. FIG. 4). The number of compounds was obviously large and thus not all compounds could be identified. In the GC-MS analysis of water extract, the detected compounds accounted only for 35% of the total area. The main components are short-chain alcohols and acids, amines and aliphatic acids and that the unidentified compounds are most likely derivates thereof. The present invention has been demonstrated to be an effective technology for catalytic liquid conversion of DDGS, giving a high yield of bio-crude oil.

EXAMPLE 2

An experiment consisting of seven consecutive runs with DDGS as feed material were conducted in the same experimental set up as described in example 1 using same analytical procedures. All runs was performed without the heterogeneous zirconia catalyst in the reactor. All runs was performed at a feed flow of approximately 11 kg/h by pressurization of the pretreated feed to approximately 250 bar and subsequently heating it to 125 C in a first heating step, subsequently heating it to approximately 350 C by mixing it with hot recirculated product from after reactor, and further heating it to approximately 370 C before removing suspended particles in a gravitational salt trap and passing it through the empty reactor. Product was withdrawn from the recirculation loop, cooled to approximately 90 C, depressurized to ambient pressurize whereafter the gas and liquids was separated in a gravitation separators and the oil-and water phases separated in a disc stack centrifuge (Alfa Laval, Sweden) thereby resulting in a fraction comprising a hydrocarbon fuel (oil) and a residual fraction (water phase with dissolved organics and salts).

For each run 25 kg of DDGS with same characteristics as in example 1 was used to prepare 100 kg of slurry for the run. In the first run the slurry was prepared by mixing with water and 2.5 wt % $K_2CO_3$. The pH of the slurry was 8.9 and the pH of the water phase after after said conversion process and separation was 8.6.

A residual fraction containing water soluble organics and dissolved salts was collected for each run. The residual fraction was fed to a mechanical vapour recompression (MVR) evaporator unit thereby resulting in a distillate fraction and a concentrate fraction containing recovered water soluble organics and salts. The content of potassium and the content of water soluble organics were measured as the Total Organic Carbon (TOC) the residual fraction and in the distillate fraction. The concentrate had a high particle concentration and due to experimental difficulties in measuring reliably on this sample no measurements on this fraction was performed. The results for the recovering step is given in table 5 below:

TABLE 5a

Results from recovering substances from residual fraction in MVR evaporator:

| Run No. | Residual Fraction Kg | Distillate Fraction kg | Concentrate Fraction Kg | Concentration Factor |
| --- | --- | --- | --- | --- |
| 1. | 73.1 | 51.05 | 22.05 | 3.3 |
| 2. | 87.1 | 66.5 | 20.6 | 4.2 |
| 3. | 60.1 | 40.3 | 19.84 | 3.0 |
| 4. | 60.1 | 40.9 | 19.2 | 3.1 |
| 5. | 72.6 | 51.1 | 21.5 | 3.4 |
| 6. | 75.5 | 58.4 | 17.1 | 4.4 |
| 7. | NA | NA | NA | NA |

TABLE 5b

Recovery of water soluble organics (Total Organic Carbon (TOC)) in recovery step.

| Run No. | TOC in Residual Fraction g/l | TOC in Distillate Fraction g/l | TOC Recovery Efficiency in recovery step % |
| --- | --- | --- | --- |
| 1. | 36.1 | 2.3 | 95.6 |
| 2. | 40.5 | 3.5 | 93.4 |
| 3. | 45.1 | 2.5 | 96.3 |
| 4. | 43.0 | 2.2 | 96.5 |
| 5. | 35.5 | 2.3 | 95.4 |
| 6. | 45.1 | 2.0 | 96.6 |

TABLE 5c

Recovery of potassium (homogeneous catalyst) in recovery step.

| Run No. | K in Residual Fraction g/l | K in Distillate Fraction g/l | K Recovery Efficiency in recovery step % |
| --- | --- | --- | --- |
| 1. | 23.7 | Not detectable | 100% |
| 2. | 37.4 | Not detactable | 100% |
| 3. | 44.6 | Not detectable | 100% |
| 4. | 43.6 | Not detectable | 100% |
| 5. | 37.5 | Not detactable | 100% |

TABLE 5c-continued

Recovery of potassium (homogeneous catalyst) in recovery step.

| Run No. | K in Residual Fraction g/l | K in Distillate Fraction g/l | K Recovery Efficiency in recovery step % |
|---|---|---|---|
| 6. | 43.9 | Not detectable | 100% |
| 7. | 42.6 | Not detactable | 100% |

Except for the first run the concentrate containing recovered water soluble organic and potassium was recirculated to the pre-treatment/feed preparation step and used to replace water i.e. the concentrate fraction from run 1 was used in run 2 and the concentrate fraction from run 2 was used in run 3 and so on. No cleaning of the MVR evaporation unit was performed between the different runs, which may have introduced some variations. The pH of the slurry after mixing with MVR was adjusted to approximately pH 9 using $K_2CO_3$. The amount of $K_2CO_3$ used for pH adjustment was only approximately 25% of the amount used for the first experiment. The pH of the residual fraction remained in the range 8.6-8.8 for all runs.

For each experimental run mass and energy balances was established over one hour after the plant had been allowed to reach steady state. The results from the different runs are given below in table 6.

TABLE 6

Overall performance results of the runs.

| Run No. | Total mass balance: Mass out/ mass in* % | Mass Yield in Oil: Mass of oil (daf)/Dry matter in* Feed % | Carbon recovery in oil: Carbon in oil/Carbon in feed* % | Energy Yield in Oil: Energy in oil/Energy in feed* % | Energy Yield in gas: Energy in gas/energy in feed* % | Lower Heat value of Oil (daf) MJ/kg |
|---|---|---|---|---|---|---|
| 1. | 98 | 25 | 41 | 48 | 3 | 36.3 |
| 2. | 102 | 42 | 62 | 85.0 | 1 | 36.1 |
| 3. | 97 | 47 | 69 | 100 | 5 | 36.1 |
| 4. | 97 | 49 | 65 | 92.0 | 5 | 36.3 |
| 5. | 95 | 51 | 59 | 87.0 | 3 | 36.2 |
| 6. | 101 | 52 | 68 | 97.0 | 5 | 36.1 |
| 7. | 99 | 54 | 65 | 95.0 | 5 | 35.8 |

*Key numbers is normalized to feed without MVR

As seen from the results in table 5a-c very high recoveries of both water soluble organics and potassium from the residual fraction are obtained in an evaporator unit based on mechanical vapour recompression.

It is further seen from performance results in table 6 that recirculation of the concentrate fraction containing recovered water soluble organics and potassium to the has a beneficial effect on the oil yields even without presence of the heterogeneous catalyst. Hence, the step of recovering substances from said residual fraction according to the present invention improves the overall efficiency and economy of the process.

FIGS. 5A-D show a specific and complete plant for converting organic material according to the present invention.

Although the present invention has been described in connection with the specified embodiments, it should not be construed as being in any way limited to the presented examples. The scope of the present invention is set out by the accompanying claim set.

The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A system for converting organic material into a hydrocarbon based fuel the organic material being during conversion contained in a feed mixture of at least the organic material and a first fluid, the system comprising:
   a pre-treatment vessel configured for pre-treatment of the organic material by at least adding to the feed mixture at least one homogeneous catalyst comprising a compound of at least one element of group 1A of the periodic table;
   a heater configured to heat the mixture in the presence of the homogeneous catalyst to between 250-500° C. during a conversion stage for converting the organic material;
   a compressor configured to pressurize the mixture in the presence of the homogeneous catalyst to between 50-400 bar during the conversion stage for converting the organic material;
   a cooler configured to cool the mixture in the presence of the homogeneous catalyst to between 25-90° C. during the conversion stage for converting the organic material after the heater heats the mixture in the presence of the homogenous catalyst and the compressor pressurizes the mixture in the presence of the homogenous catalyst;
   a valve configured to expand the mixture in the presence of the homogeneous catalyst to ambient pressure during the conversion stage for converting the organic material after the heater heats the mixture in the presence of the homogenous catalyst and the compressor pressurizes the mixture in the presence of the homogenous catalyst, wherein the mixture comprises a converted organic material after the cooler cools the mixture in the presence of the homogenous catalyst and the valve expands the mixture in the presence of the homogenous catalyst;
   a separation system configured to separate from the mixture at least a residual fraction and fraction comprising hydrocarbon based fuel; and
   a recovery unit configured to recover substances from the residual fraction, wherein said recovery unit is configured to perform evaporation or a distillation based on mechanical or thermal vapour recompression, wherein the recovery unit is further configured to recirculate said recovered substances from the residual fraction to the pre-treatment vessel.

2. The system according to claim 1, wherein the system is configured to supply distillate from said recovery unit to a flue gas cleaning plant.

3. The system according to claim 1, wherein the substances recovered by the recovery unit comprise a catalyst fraction comprising at least one homogeneous catalyst comprising a compound of group 1A of the periodic table.

4. The system according claim 3, wherein the system is further configured to re-circulate, the catalyst fraction to the pre-treatment vessel in such a manner that the catalyst fraction is mixed into the feed mixture.

5. The system according to claim 4, wherein the amount of catalyst recovered and mixed into the feed mixture is more than 50 wt % of the total amount of homogeneous catalyst in the feed mixture measured after pre-treatment.

6. The system according to claim 1, wherein the substances recovered by the recovery unit comprise a part containing water soluble organic compounds.

7. The system according to claim 6, wherein the system is further configured to re-circulate the recovered water soluble organic compounds to the pre-treatment vessel in such a manner that the organic compounds are mixed with the feed mixture.

8. The system according to claim 7, wherein the amount of organic compounds recovered and mixed into the feed mixture is more than 50 wt % of the water soluble organics in the residual fraction.

9. The system according to claim 1, wherein the recovery unit comprises an evaporator unit.

10. The system according to claim 9, wherein said evaporator unit comprises a mechanical vapor recompression evaporator unit.

11. The system according to claim 1, wherein the recovery unit is further configured to recover water soluble organics from said residual fraction.

12. The system according to claim 1, further comprising a heterogeneous catalyst comprising a compound of at least one element of group IVB of the periodic table and/or alpha-alumina, said heterogeneous catalyst being arranged so that said feed mixture contacts the heterogeneous catalyst, after said feed mixture is pressurized and heated.

13. The system according to claim 1, wherein the homogeneous catalyst comprises potassium and/or sodium.

14. The system according to claim 12, wherein the heterogeneous catalyst comprises at least one element of group IVB of the periodic table in an oxide and/or hydroxide form and/or sulphide form and/or sulphate form and/or phosphate form or a combination of the these.

15. The system according to claim 14, wherein the heterogeneous catalyst further comprises at least one element selected from the group consisting of Fe, Ni, Co, Cu, Cr, W, Mn, Mo, V, Sn, Zn, Si, Pt, and Ru in an amount up to 20% by weight.

16. The system according to claim 12, wherein said heterogeneous catalyst is in the form of a monolith structure and wherein said heterogeneous catalyst is at least partly contained in a reactor wherein said reactor is a fixed bed reactor.

17. The system according to claim 1, wherein the valve is an expansion valve.

* * * * *